United States Patent Office 3,439,038
Patented Apr. 15, 1969

3,439,038
PROCESS FOR PRODUCING AMINOACETYLENES FROM PROPARGYLAMINES
Heinz G. Viehe, Linkebeek, and André J. Hubert, Brussels, Belgium, assignors to Union Carbide Corporation, a corporation of New York
No Drawing. Filed Sept. 29, 1965, Ser. No. 491,371
Int. Cl. C07c 85/00
U.S. Cl. 260—583     9 Claims

ABSTRACT OF THE DISCLOSURE

Aminoacetylenes having the nitrogen atom attached to one of the carbon atoms bearing the triple bond are prepared by contacting a propargylamine with a dispersion of potassium metal or potassium amide on alumina.

---

This invention relates to aminoacetylenes. More particularly, the invention is directed to a method for producing aminoacetylenes from propargylamines.

According to the process of this invention, aminoacetylenes represented by the formula:

(A)     $R'CH_2C \equiv CNR_2$ are produced by contacting one or more propargylamines represented by the formula:

(B)     $R'C \equiv CCH_2NR_2$ with a dispersion of potassium metal or potassium amide on alumina ($Al_2O_3$).

In Formulas A and B, R' represents hydrogen or a monovalent hydrocarbon group, R represents a monovalent hydrocarbon group and two R groups on the same nitrogen atoms can together form a divalent aliphatic group, such as a hydrocarbon group, i.e., alkylene, or a group containing atoms other than carbon and hydrogen, such as oxygen or nitrogen, i.e., an alkyleneoxyalkylene group and the like.

The R groups and the R' groups (when R' represents monovalent hydrocarbon) can be alkyl, aryl, alkaryl, aralkyl, alkenyl, cycloalkyl, cycloalkenyl, and the like groups. For example, R and R' can be methyl, ethyl, n-butyl, tertiary-butyl, 2,2-dimethyl-n-propyl, iso-octyl, octadecyl, phenyl, phenylethyl, terphenyl, cumyl, mesityl, cyclopentyl, ethylcyclohexenyl, allyl, and the like, and two R groups on the same nitrogen atom can together be tetramethylene, pentamethylene, 3-ethylhexamethylene, decamethylene, ethyleneoxyethylene, and the like. In formulas A and B, the R groups and R' groups (when R' is monovalent hydrocarbon) preferably are free from aliphatic unsaturation and contain from 1 to about 18 carbon atoms. The R groups can be the same or different throughout the same molecule. When both R groups together form a ring with the nitrogen atom to which they are attached, it is preferred that the ring contain at least 5 atoms.

Throughout the present specification and claims, $C_6H_5$, $C_6H_4$, $C_2H_5$, and t-$C_4H_9$ represent the phenyl group, paraphenylene group, ethyl group and tertiary butyl group, respectively.

Typical compounds of Formula A are those having the formulas:

(a)     $CH_3C \equiv CN(C_2H_5)_2$ (b)     t-$C_4H_9CH_2C \equiv CN(CH_3)_2$ (c) 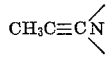
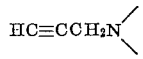

(d) 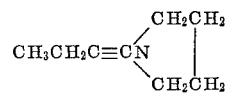

(e) 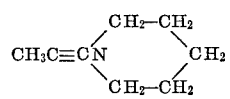

(f) 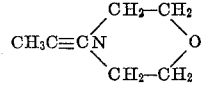

(g) 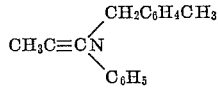

The corresponding compounds of Formula B from which compounds (a)–(g) are prepared are those in which the unit $$CH_3C \equiv C\overset{/}{N}\underset{\backslash}{}$$

is replaced by the unit $$HC \equiv CCH_2N\overset{/}{\underset{\backslash}{}}$$

The compounds of Formula B are known compositions and can be prepared by conventional procedures.

All of the compounds of Formula A react with hydrogen halides with the formation of hydrogen halide salts, and are therefore useful under anhydrous conditions as hydrogen halide acceptors. For example, all of the compounds of Formula A can be used as hydrogen halide acceptors in the process for producing cyclopentadienyl metal compounds described in Morehouse, U.S. Patent 3,071,605, issued Jan. 1, 1963.

The dispersions of potassium metal or potassium amide on alumina can be prepared by known methods. Potassium amide dispersions can be prepared by adding potassium metal to a suspension of alumina powder in an excess of liquid ammonia and then evaporating the excess ammonia after reaction of the potassium and ammonia is complete. The rate of reaction of potassium with ammonia can be increased by adding small quantities of ferric nitrate as a catalyst. Dispersions of potassium metal on powdered alumina can be prepared by the method of Haag and Pines, J. Am. Chem. Soc., 82, 387 (1960).

The process of this invention is carried out by maintaining one or more compounds of Formula B in contact with a dispersion of potassium metal or potassium amide on alumina until one or more compounds of Formula A are produced. This can be done in a batch process, or the compound of Formula B can be passed through a bed or column containing the K-$Al_2O_3$ or $KNH_2$-$Al_2O_3$ catalyst in a continuous process.

Preferably, the compound of Formula B is dissolved in an inert, liquid organic solvent prior to contact with the K-$Al_2O_3$ or $KNH_2$-$Al_2O_3$ catalyst. Suitable organic solvents useful in the process of this invention include non-protic solvents such as hydrocarbons, hydrocarbon ethers, tertiary amines, and the like. Illustrative solvents include hydrocarbons such as petroleum ether, cyclohexane, 2-ethylhexane, benzene, toluene, xylene and the like; ethers such as diethyl ether, diisopropyl ether, methylbutyl ether, tetrahydrofuran, ethylene glycol dimethyl ether, diethylene glycol dimethyl ether, and the like; tertiary amines, such as trimethylamine, triethylamine, and the like.

It is preferable to carry out the process of this invention under anhydrous conditions and in the absence of oxygen. This can be conveniently done by using an atmosphere of inert gas, such as nitrogen, argon, helium, and the like.

The temperatures at which the process of this invention can be carried out can vary from normal room temperature up to 100° C. and above. Preferably the temperature is maintained above 25° C., and a particularly convenient elevated temperature is the boiling point of the solvent in which the compound of Formula B is dissolved.

The compound of Formula A is produced in recoverable quantities in times which vary from a few minutes to a several hours, depending upon the various reaction conditions, primarily the particular compound of Formula B, the temperature, and the ratio of compound of Formula B to potassium in the catalyst.

The process of this invention is operable when the amount of potassium in the catalyst is relatively small compared to the amount of compound of Formula B. However, best results are obtained when the ratio of compound of Formula B to potassium (as metal or as cation in potassium amide) is no greater than ten to one.

There is no particular advantage to be gained in carrying out the reaction at pressures other than atmospheric pressure. However, when a sealed reaction vessel is employed, the autogeneous pressure of the reaction mixture at the reaction temperature is satisfactory.

The reaction products of Formula A can be separated from the reaction mixture by conventional methods which include separation of liquid from solid materials and isolation of the desired product by evaporation of solvent, fractional distillation, and the like. Product separation is preferably carried out under an inert atmosphere. Several methods of product recovery are illustrated in the examples hereinbelow.

The following examples further illustrate the invention.

EXAMPLE 1

Powdered alumina (25 cc.) was stirred in liquid ammonia (100 cc.), while potassium (3 g.) and a crystal of $Fe(NO_3)_3$ were added. The ammonia was evaporated from the solution of potassium amide while stirring under nitrogen. Next, a solution of N,N-diethyl propargylamine, $HC \equiv CCH_2N(C_2H_5)_2$, (40 cc.) in benzene (20 cc.) was added quickly and the mixture refluxed under nitrogen on an oil-bath (heated at 180° C.). After 10 minutes the reaction vessel was removed from the oil bath, allowed to cool, and 200 cc. of diethyl ether were added. Solid materials were removed by filtration and the filtrate was fractionally distilled. The aminoacetylene product, $CH_3C \equiv CN(C_2H_5)_2$, was recovered in 60 percent yield, boiling point 127°–130° C. at 760 mm. Hg. The aminoacetylene product was identified by infrared spectroscopy and gas-liquid partition chromatography. The distillation residue included about 5 cc. of polymeric material.

EXAMPLE 2

Following the procedures of Example 1, 35 cc. of N,N-diethylpropargylamine dissolved in 17.5 cc. of benzene were added to potassium amide (prepared from 5 grams potassium metal) dispersed on 35 cc. alumina, heated at reflux for 10 minutes, cooled, and the product recovered as in Example 1. The yield of $CH_3C \equiv CN(C_2H_5)_2$ was 43 percent.

EXAMPLE 3

Following the procedures of Example 1, 10 cc. of N,N-diethylpropargylamine dissolved in 5 cc. of benzene were added to potassium amide (prepared from 0.5 gram potassium metal) dispersed on 5 cc. alumina, heated at reflux for 10 minutes, cooled, and the product recovered as in Example 1. The yield of $CH_3C \equiv CN(C_2H_5)_2$ was 30 percent.

EXAMPLE 4

Following the same procedure of Example 1, 80 cubic centimeters of N,N-diethylpropargylamine were dissolved in 40 cubic centimeters of benzene and this solution then added to potassium amide (prepared from 2 grams of potassium metal) dispersed on 25 cubic centimeters of alumina. The mixture was heated at reflux and the isomerization followed by infrared spectroscopy. After refluxing for forty minutes, only trace amounts of $CH_3C \equiv CN(C_2H_5)_2$ were detected by the infrared examination. Separation and recovery of the products in a manner similar to that of the previous examples afforded a 34 percent yield of a product having a boiling point of 110–120° C. at a pressure of 1 millimeter of mercury and the following composition: C, 74.8; H, 12.05; N, 12.65, molecular weight 231. This corresponds to compositions having an empirical formula of $C_{14}H_{26}N_2$ which requires: C, 75.6; H, 11.8; N, 12.6. Molecular weight 222. Hydrogenation of this product gave 70 percent yield of an amine which had a boiling point of 100–110° C. at a pressure of 1 millimeter, and which no longer absorbs at 6.1μ in the infrared. The hydrogenated product had the following composition: C, 73.25; H, 13.35; N, 12.5. This corresponds to compositions having an empirical formula of $C_{14}H_{30}N_2$ which requires: C, 74.3; H, 13.3; N, 12.4. From the ultraviolet, infared spectra and above data the structure of the product has a cyclobutane nucleus with two diethylaminomethylene groups attached.

EXAMPLE 5

About 10 cc. of N,N-diethylpropargylamine (no solvent) was added to 0.25 gram of potassium metal dispersed on 5 cc. of alumina and the mixture was heated at reflux for about 5 minutes. The yield of $$CH_3C \equiv CN(C_2H_5)_2$$

was 13 percent.

EXAMPLE 6

About 5 cc. of N,N-diethylpropargylamine dissolved in 5 cc. of benzene was added to 0.5 gram of potassium metal dispersed on 5 cc. of alumina and the mixture was heated at reflux for about 15 minutes. The yield of $CH_3C \equiv CN(C_2H_5)_2$ was 20 percent.

Table 1 illustrates the effect of the propargylamine-potassium ratio on the yield of aminoacetylene. The data in Table 1 are based on Examples 1–6.

TABLE 1

| Example | Propargylamine-K ratio | $K-Al_2O_3$ ratio | Yield of aminoacetylene (percent) |
|---|---|---|---|
| (1) ($KNH_2$) | 4 | 0.003 | 60 |
| (2) ($KNH_2$) | 2 | 0.004 | 40 |
| (3) ($KNH_2$) | 5 | 0.003 | 30 |
| (4) ($KNH_2$) | 11 | 0.002 | Trace |
| (5) (K) | 11 | 0.0015 | 13 |
| (6) (K) | 3 | 0.003 | 20 |

EXAMPLE 7

In order to demonstrate that the process of this invention is adaptable for use in a continuous process, potassium amide (from 2 grams of potassium) was dispersed on 20 cubic centimeters of alumina and this mixture poured under nitrogen into a column which could be heated by means of a furnace. A solution of 157 grams of N,N-diethylpropargylamine in 250 cubic centimeters of hexane was poured into the column which was heated to approximately 65° C. and filtered slowly through it. The rate of elution was carefully controlled so that the contact time was approximately 45 minutes. The reaction was easily followed by infrared spectroscopy of samples of eluted solution. Thereafter, the solution was distilled and the aminoacetylene product, $CH_3C \equiv CN(C_2H_5)_2$, was obtained in 65 percent yield. The aminoacetylene product was identified by infrared spectroscopy and gas-liquid partition chromatography.

EXAMPLE 8

In a manner identical to that employed in Example 7, a solution of 77 grams of N,N-dimethylpropargylamine in 110 cubic centimeters of decane was filtered through the catalyst which was maintained at 65° C. and the aminoacetylene product, $CH_3-C\equiv CN(CH_3)_2$, obtained in a 25 percent yield. The product had a boiling point of 90–100° C. at a pressure of 760 millimeters of mercury.

EXAMPLE 9

In a manner identical to that employed in Example 7, a solution of 37 grams of N-propargylpyrrolidine in 45 cubic centimeters of hexane was eluted through the column and the aminoacetylene product

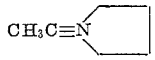

obtained in 35 percent yield.

EXAMPLE 10

In a manner identical to that employed in Example 7, a solution of 200 grams of N-propargylpiperidine in 250 cubic centimeters of hexane was eluted through the column containing freshly prepared catalyst. The aminoacetylene product

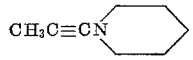

obtained in 38 percent yield.

EXAMPLE 11

In a manner identical to that employed in Example 7, a solution of 38 grams of 4-propargylmorpholine in 45 cubic centimeters of hexane was eluted through the column and the aminoacetylene product

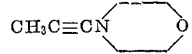

obtained in 25 percent yield.

Although the invention has been illustrated by the preceding examples, it is not to be construed as limited to the materials employed therein, but rather, the invention encompasses the generic area as hereinbefore disclosed. Various embodiments and modifications of this invention can be made without departing from the spirit and scope thereof.

What is claimed is:

1. A process for producing aminoacetylenes having the formula:

$$R'CH_2C\equiv CNR_2$$

wherein R' represents hydrogen or alkyl and alkylmonocarbocyclicaryl containing from one to about 18 carbon atoms, R represents alkyl, alkenyl or phenyl containing from one to 18 carbon atoms, and the two R groups can together form tetramethylene, pentamethylene or ethyleneoxyethylene, which process comprises contacting a compound represented by the formula:

$$R'C\equiv CCH_2NR_2$$

wherein R and R' have the meanings defined hereinabove, with a catalyst selected from the group consisting of a dispersion of potassium metal on alumina or potassium amide on alumina.

2. The process of claim 1 wherein the compound $R'C\equiv CCH_2NR_2$ is dissolved in an inert liquid organic solvent.

3. The process of claim 2 wherein the compound $R'C\equiv CCH_2NR_2$ is contacted with potassium amide on alumina, the ratio of $R'C\equiv CCH_2NR_2$ to potassium being not greater than ten to one, and the temperature being at least about 25° C.

4. The process of claim 2 wherein the compound $R'C\equiv CCH_2NR_2$ is contacted with potassium metal on alumina, the ratio of $R'C\equiv CCH_2NR_2$ to potassium being not greater than ten to one, and the temperature being at least about 25° C.

5. A process for producing aminoacetylenes having the formula:

$$CH_3C\equiv CNR_2$$

wherein R represents alkyl, alkenyl or phenyl containing from one to 18 carbon atoms, and the two R groups can together form tetramethylene, pentamethylene or ethyleneoxyethylene, which process comprises contacting a compound represented by the formula:

$$HC\equiv CCH_2NR_2$$

wherein R has the meaning defined hereinabove, with a catalyst selected from the group consisting of a dispersion of potassium metal on alumina or potassium amide on alumina.

6. The process of claim 5 wherein the compound $HC\equiv CCH_2NR_2$ is dissolved in an inert liquid organic solvent.

7. The process of claim 5 wherein the compound $HC\equiv CCH_2NR_2$ is contacted with potassium amide on alumina, the ratio of $HC\equiv CCH_2NR_2$ to potassium being not greater than ten to one, and the temperature being at least about 25° C.

8. The process of claim 5 wherein the compound $HC\equiv CCH_2NR_2$ is contacted with potassium metal on alumina, the ratio of $HC\equiv CCH_2NR_2$ to potassium being not greater than ten to one, and the temperature being at least about 25° C.

9. The process of claim 7 wherein both R groups are ethyl groups.

References Cited

Dumont: Academe Des Sciences Comptes Rendus, vol. 261 (August 1965), pp. 1710–1712.

CHARLES B. PARKER, *Primary Examiner.*

R. L. RAYMOND, *Assistant Examiner.*

U.S. Cl. X.R.

260—247, 293, 326.8, 563, 570.8, 570.9